United States Patent
Crowther et al.

(10) Patent No.: US 7,836,101 B2
(45) Date of Patent: Nov. 16, 2010

(54) HETEROGENEOUS DISK STORAGE MANAGEMENT TECHNIQUE

(75) Inventors: David Aaron Crowther, Aloha, OR (US); Ravindra Kumar Rama Reddy, Beaverton, OR (US); Andrew Eugene Adkins, Portland, OR (US); Nanyu Cao, Portland, OR (US)

(73) Assignee: Thomson Licensing, Boulogne-Billancourt (FR)

( * ) Notice: Subject to any disclaimer, the term of this patent is extended or adjusted under 35 U.S.C. 154(b) by 1246 days.

(21) Appl. No.: 10/519,856

(22) PCT Filed: Jun. 4, 2003

(86) PCT No.: PCT/US03/17608

§ 371 (c)(1),
(2), (4) Date: Dec. 29, 2004

(87) PCT Pub. No.: WO2004/003783

PCT Pub. Date: Jan. 8, 2004

(65) Prior Publication Data

US 2005/0216481 A1     Sep. 29, 2005

Related U.S. Application Data

(60) Provisional application No. 60/392,779, filed on Jul. 1, 2002.

(51) Int. Cl.
*G06F 17/30* (2006.01)
(52) U.S. Cl. .................. 707/805; 709/220; 711/112
(58) Field of Classification Search ............ 707/10, 707/102, 200, 805, 802, 790; 715/734, 764; 709/224, 220; 711/112
See application file for complete search history.

(56) References Cited

U.S. PATENT DOCUMENTS

| 5,983,283 A | * | 11/1999 | Senator et al. ............... 719/321 |
| 6,009,466 A | | 12/1999 | Axberg et al. |
| 6,101,559 A | | 8/2000 | Schultz et al. |

(Continued)

FOREIGN PATENT DOCUMENTS

EP     1 067 732 A2     1/2001

OTHER PUBLICATIONS

Search Report Dated Aug. 5, 2003.

(Continued)

*Primary Examiner*—Neveen Abel Jalil
*Assistant Examiner*—Sherief Badawi
(74) *Attorney, Agent, or Firm*—Robert D. Shedd; Robert B. Levy

(57) ABSTRACT

Management of one or more storage devices is achieved by first identifying each device by its make and model, and then establishing a database containing information about that device, such as (a) operational rules, (b) commands and (c) processing routines. From the information obtained from the database, a Graphical User Interface is created for display to afford a user at least one menu option for selection. Upon selecting the one menu option, the user obtains at least one of (a) a display of information associated with the identified storage device, and (b) execution of at least one process to control, at least in part, the operation of the identified storage device. The user's selection is processed and the Graphical User Interface is automatically updated in response to the processing of the user's selected menu option.

9 Claims, 3 Drawing Sheets

U.S. PATENT DOCUMENTS

| | | | |
|---|---|---|---|
| 6,266,740 | B1 | 7/2001 | Don et al. |
| 6,346,954 | B1 | 2/2002 | Chu et al. |
| 6,519,678 | B1 | 2/2003 | Basham et al. |
| 6,538,669 | B1 * | 3/2003 | Lagueux et al. ............. 715/764 |
| 7,003,527 | B1 * | 2/2006 | Lavallee et al. ............. 707/102 |
| 7,171,624 | B2 * | 1/2007 | Baldwin et al. ............. 715/734 |
| 2001/0020254 | A1 * | 9/2001 | Blumenau et al. ........... 709/229 |
| 2002/0019908 | A1 | 2/2002 | Reuter et al. |

OTHER PUBLICATIONS

Beeson, Client/Server; GUI Software Simplified Raid Management, Computer Technology Review 15, Nov. 1, 1995, No. 11, pp. 50, 52, Los Angeles, CA, US.

Ross, et al., Volume Management by the Book: The NAStore Volume Manager, NASA Ames Research Center, 1991, pp. 95-99.

Russell, Steve et al., *Netfinity Server Disk Subsystems, Japanese Version*, Fourth Edition, IBM Japan, Ltd., Jun. 30, 2000, pp. 79-90.

* cited by examiner

HETROGENIOUS LOW-LEVEL DISK STORAGE MANAGEMENT TOOL OPERATIONAL FLOW CHART

DISCOVERY — 100
DISCOVERY IS THE FIRST OPERATION PERFORMED UPON STARTING THE STORAGE MANAGEMENT UTILITY. ALL FC/SCSI DEVICES, WHETHER ATTACHED DIRECTLY OR THROUGH A FABRIC, ARE IDENTIFIED AND ENUMERATED. THESE MAY INCLUDE DRIVES, LUs, AND RAID CONTROLLERS ALL OF WHICH ARE SORTED ACCORDING TO THEIR RESPECTIVE FIBRE CHANNEL IDs, LUN NUMBERS, AND VENDOR UNIQUE IDENTIFICATION STRINGS.

CATEGORIZE DEVICES BY VENDOR — 110
BUILD A DATABASE CONTAINING CONFIGURATION AND OPERATIONAL RULES FOR EACH UNIQUE DRIVE OR RAID VENDOR DEVICE ON THE NETWORK.

GUI PRESENTATION TO THE USER — 120
PRESENT TO THE USER A UNIFORM GUI COMPRISED OF AN INTUITIVE TREE CONTROL. THE OPERATIONAL COMPLEXITIES OF EACH DISPARATE DEVICE ARE HIDDEN FROM THE USER. BY LEFT CLICKING ANY DEVICE, RELEVANT INFORMATION APPEARS IN THE INFORMATIONAL WINDOW INCLUDING: FIRMWARE REVISION NUMBERS, FIBRE CHANNEL IDs MODEL NAMES, AND STATE INFORMATION

WAIT FOR USER INPUT — 122
THE USER MAY PERFORM A LOW LEVEL OPERATION BY RIGHT CLICKING ON THE DESIRED DEVICE AND SELECTING FROM THE FEATURED MENU OPTIONS, OR BY USING THE MENU OPTIONS AT THE TOP OF THE WINDOW. THESE MAY INCLUDE (BUT ARE NOT LIMITED TO):
- BIND A GROUP OF PHYSICAL DRIVES INTO A LOGICAL UNIT NUMBER (LIN)
- UNBIND LUNs
- DESIGNATE PHYSICAL DRIVES AS HOT SPARES
- SET DEVICE SYSTEM CLOCK
- LOAD VENDOR SPECIFIC FIRMWARE TO INDIVIDUAL CONTROLLERS AND/OR DRIVES
- CHECK/SET VENDOR SPECIFIC CONTROLLER AND/OR DRIVE SETTINGS
- BLINK LEDs FOR IDENTIFICATION PURPOSES
- IDENTIFY STATE INFORMATION
- SET FIBRE CHANNEL IDs FOR EACH DEVICE
- START OR STOP A RAID REBUILD OPERATION
- START OR STOP CONSISTENCY CHECK OPERATIONS
- IN THE CASE OF A DISCREET SYSTEM, INITIALIZE A FILE SYSTEM

PROCESS COMMAND — 124
PROCESS THE USER INITIATED COMMAND THROUGH THE SOFTWARE STACK UNTIL EVENTUALLY BEING SERVICED BY THE SPECIFIC DRIVE OR RAID VENDOR DEVICE (SEE THE ACCOMPANYING SOFTWARE STACK BLOCK DIAGRAM).

AUTOMATIC REFRESH — 126
ONCE THE COMMAND HAS COMPLETED, AN AUTOMATIC REFRESH OF THE GUI OCCURS BRING THE DISPLAY UP TO DATE WITH THE NEW STATE OF THE STORAGE NETWORK.

→ BACK TO: WAIT FOR USER INPUT

*FIG. 2*

HETEROGENEOUS DISK STORAGE MANAGEMENT TECHNIQUE

CROSS REFERENCE TO RELATED APPLICATION

This application claims the benefit, under 35 U.S.C. §365 of International Application PCT/US03/17608, filed Jun. 4, 2003, which was published in accordance with PCT Article 21(2) on Jan. 8, 2004 in English and which claims the benefit of U.S. provisional patent application No. 60/392,779, filed Jul. 1, 2002.

TECHNICAL FIELD

This invention relates to a technique for managing one or more storage devices.

BACKGROUND ART

Advances in the design and manufacture of magnetic storage devices have significantly reduced the cost of such devices, as measured in terms of the cost per gigabyte of storage capacity. The relatively low cost of high storage capacity devices has resulted in the proliferation of large arrays of such devices, such as a Redundant Array of Independent Disks (RAID). Various manufacturers of storage devices commonly offer such RAIDs with proprietary software for controlling the individual storage devices within the RAID.

Storage devices from different manufactures often have different features. Combining storage devices from different manufacturer affords the ability to take advantage of the best features of each device. Unfortunately, no technique presently exists for low-level management of heterogeneous storage devices, such as a set of heterogeneous storage devices within a RAID. While software presently exists for managing RAIDs from different vendors across a network, such software lacks the ability to manage one or more storage devices from separate vendors in a single RAID, or to effectively manage a stand-alone storage device.

Thus, there is a need for a technique for managing one or more storage devices.

BRIEF SUMMARY OF THE INVENTION

Briefly, in accordance with present principles, there is provided a method for managing at least one storage device, such as a magnetic disk drive, magneto-optical device, or a tape storage device, and preferably, a plurality of such storage devices. The method commences by identifying each device, typically by its manufacturer. For each identified storage device, a database is created containing information about that device. For example, the information within such a database will include the working characteristics of that storage device, specific interface protocols and operational rules. From the information about each storage device obtained from the corresponding database, a Graphical User Interface (GUI) is created for display to provide a user with at least one menu option for selection. Upon selecting the one menu option, the user obtains at least one of (a) a display of information associated with the identified storage device, and (b) execution of at least one process to control, at least in part, the operation of the identified storage device. The user's selection is processed and the Graphical User Interface is automatically updated in response to the processing of the user's selected menu option. Thus, for example, if the user had selected a menu option to cause the identified storage device to perform a particular operation, the Graphical User Interface provides an updated display that reflects the results of that operation performed by the storage device.

BRIEF DESCRIPTION OF THE DRAWINGS

FIG. 2 depicts in flow chart form the steps of a method executed by the system of FIG. 1 to manage the at least one storage device.

DETAILED DESCRIPTION

Figure 1:
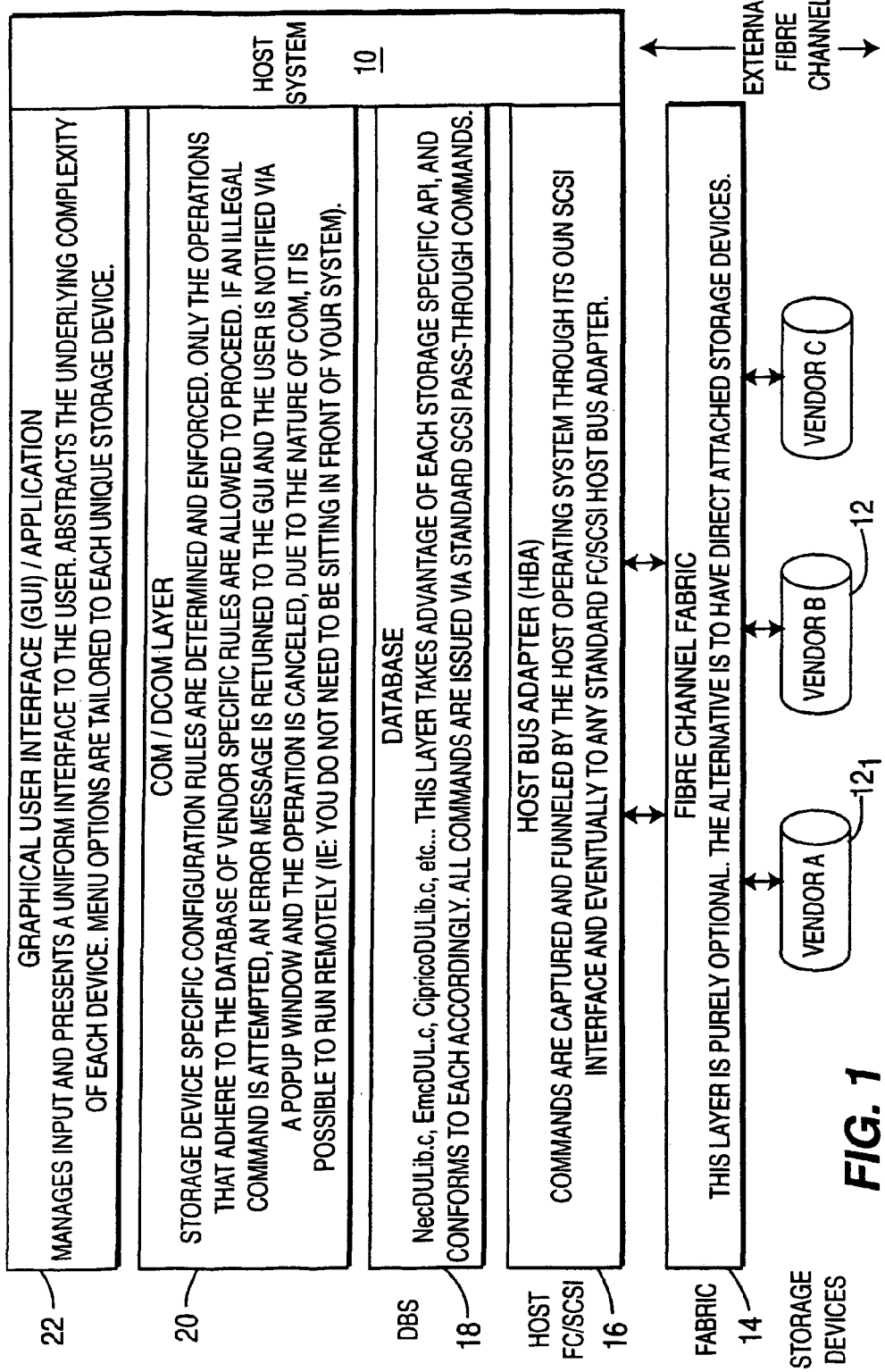
FIG. 1 depicts a block schematic diagram of a system in accordance with present principles for managing at least one storage device.

FIG. 1 depicts a block schematic diagram of a host system 10 for managing at least one, and preferably a plurality of storage devices, exemplified by storage devices $12_1$, $12_2$ and $12_3$. Each of the storages devices $12_1$, $12_2$ and $12_3$ can take the form of a single magnetic or optical disk drive, a magnetic tape drive, or an array of individual storage devices, such as a Redundant Array of Independent Disks (RAID). In practice, the storage devices $12_1$-$12_3$ originate from different manufacturers. Thus, each storage device often possesses slightly different operating characteristics that must be taken into account when managing that device.

A fibre channel fabric 14 couples the storage devices $12_1$-$12_3$ to a host bus adapter 16 that interfaces the devices to the host system 10. The host bus adapter 16 typically has its own Small Computer System Interface (SCSI) to funnel information between the host system 10 and the storage devices $12_1$-$12_3$ through the fibre channel fabric 14. The host bus adapter 16 can include other interfaces for disk storage devices that do not use SCSI. Note that the storage devices $12_1$-$12_3$ could each enjoy a direct connection with the host bus adapter 16, thereby obviating the need for the fibre channel fabric 14. Thus, the storage devices $12_1$-$12_3$ are not limited to fibre channel storage devices but could comprise any type of storage device responsive to SCSI commands.

The host system 10 typically comprises a general-purpose computer such as a well know personal computer or a mini computer. Associated with the host system 10 is at least one database (DBS) 18 that contains one or more libraries. Each library within the database 18 contains information specific to a corresponding one of the storage devices $12_1$-$12_3$. In particular, the library associated with each of the storage devices $12_1$-$12_3$ typically includes the operating characteristics associated with that storage device. The device operating characteristics includes at least one of (a) operational rules, (b) commands, and (c) processing routines. While the embodiment of FIG. 1 depicts a single database 18 that contains the associated library for each of the storage devices $12_1$-$12_3$, the library associated with each storage device could reside on a separate database (not shown). In practice, each library in the database 18 depends only on SCSI commands. Thus, the host bus adapter 16 need not be limited to a Fibre Channel (FC)/SCSI host bus adapter because regardless of the lower level protocol (e.g., fibre channel fabric in this case), the commands in the library don't need to rely on the specific host bus adapter protocol.

The host system 10 includes a Communication Object Model (COM)/Distributed Communications Object Model (DCOM) layer 20, which, in practice, takes the form of a memory that includes specific configuration rules for each of the storage devices $12_1$-$12_3$. In practice, the configuration rules for each storage device are determined from the information stored in the corresponding library for each such device. The COM/DCOM layer 20 also includes one or more applets, programs and/or sub-routines (collectively referred as "programs") typically in the form of C++ objects that are exposed via multiple interfaces and can be instantiated via multiple languages across multiple machines in one or more networks. The programs in the COM/DCOM layer 20 monitor each requested operation for each of the storage devices $12_1$-$12_3$ to ensure that the requested operation complies with the rules for that storage device as established by its manufacturer. Any requested operation of a storage device not in compliance with the rule(s) associated with that device will be blocked and an error message will be generated. Execution by the host system 10 of the programs resident in the COM/DCOM layer 20 can occur without the need for the user to remain at a terminal (not shown).

The host system 10 also executes a Graphical User Interface (GUI) application 22 that manages input information received from each of the storage devices $12_1$-$12_3$ as well as input information received from one or more users. From such input information, the GUI application 22 generates a graphical interface for display to the user on a display device (not shown). The overall format of the information displayed by the GUI 22 to the user for each storage drive has a uniform appearance, but different menu options are tailored for each storage device to account for its particular features.

FIG. 2 illustrates in flow chart form the steps of a method executed by the host system 10 to manage the storage devices $12_1$-$12_3$ in accordance with the present principles. The method of FIG. 2 commences upon execution of step 100 during which the host system 10 of FIG. 1 undertakes discovery of which storage devices are attached thereto. In other words, during step 100, the host system 10 launches a query to determine the identity of the attached devices $12_1$-$12_3$, and particularly, the make (i.e., the manufacturer) and the model number of each device. In addition to discovering the make and model of each device, the host system 10 also ascertains during step 100 whether each device is directly attached to the host bus adapter 16 or is attached through the fibre channel fabric 14. During step 100, the host system 10 will assign an identifier to each discovered storage devices. The assigned identifier can comprise a fibre channel fabric identifier assigned when the device is attached to the fibre channel fabric 14 of FIG. 1. Alternatively, the identifier could comprise a Logical Unit Number (LUN) or vendor identification number assigned to the device.

Following step 100, execution of step 110 occurs at which time, the host system 10 categorizes each discovered storage device by its make and model. During step 110, the host system 10 establishes a library for each storage device discovered during step 100, with each library residing in a single database (e.g., database 18 of FIG. 1) or in separate databases. As discussed previously, each library associated with a storage device will include the operational rules, commands and processing routines associated with that device. Execution of step 120 follows step 110 at which time, the host system 10 executes the Graphical User Interface (GUI) application 22 of FIG. 1 to create and display the GUI to the user.

Figure 3:
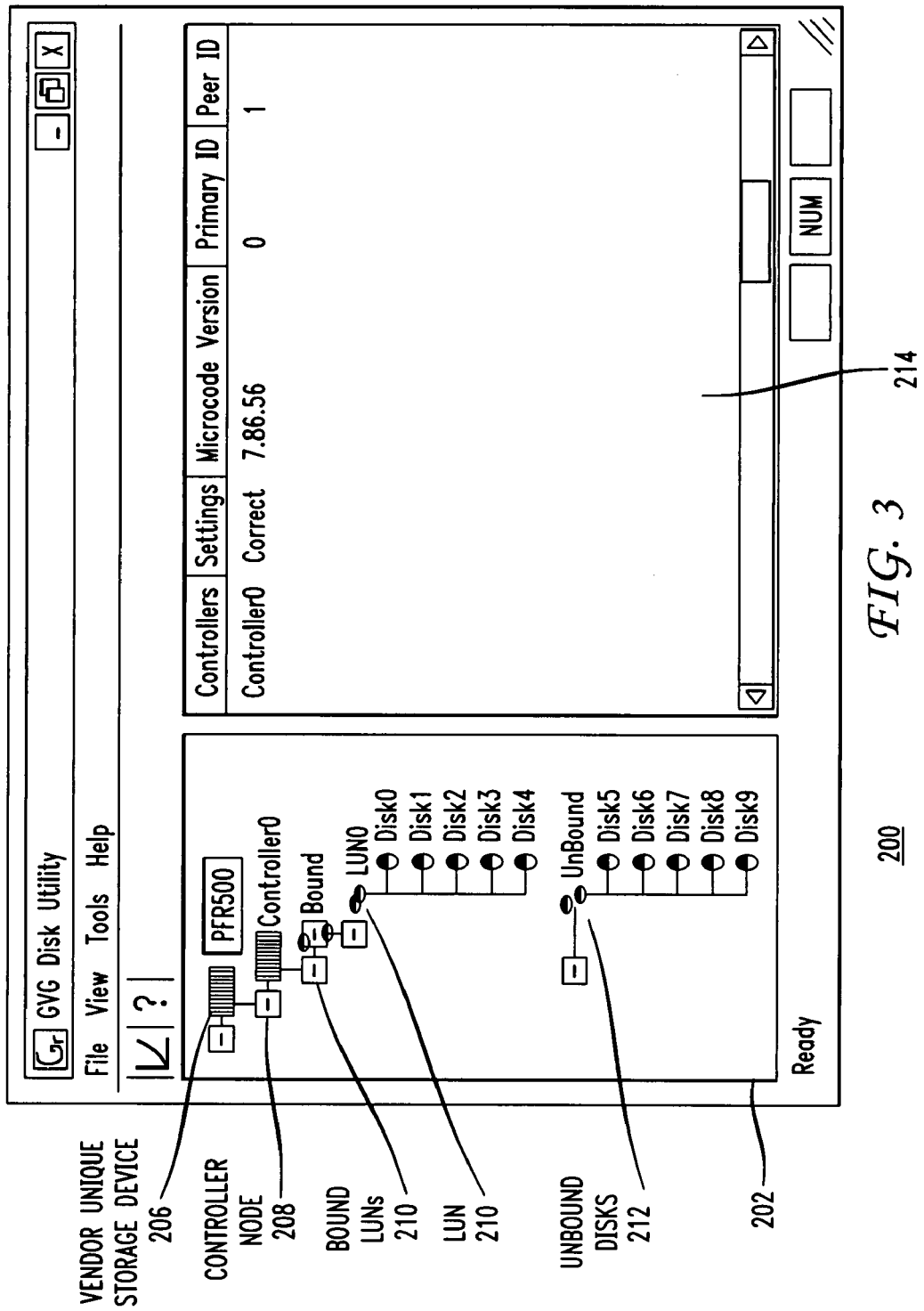
FIG. 3 depicts an opening screen of a Graphical User Interface displayed to a user.

FIG. 3 depicts an illustrative screen display 200 that comprises part of the GUI provided to the user. The screen display 200 includes system pane 202 typically appearing at the left-hand side of the screen display. The system pane 202 provides a hierarchical display of the various devices and sub-elements found by the host system 10 during step 100 of FIG. 2, with each device and sub-element appearing in the system pane 202 of FIG. 3 as a corresponding icon. In the exemplary embodiment of FIG. 3, the icon 206 appearing in the system pane 202 corresponds to the presence of a Vendor Unique Storage Device found by the host system 10 during step 100 of FIG. 2. The icon 208 appearing in the system pane 202 of FIG. 3 corresponds to a controller node within the Vendor Unique Storage Device represented by the icon 206. The icon 210 within the system pane 202 signifies the existence of one or more bound LUNs associated with the controller node represented by icon 206. The icon 210 identifies a corresponding LUN within the Bound LUNs represented by the icon 210. Lastly, the icon 212 within the system pane 202 of FIG. 3 signifies the presence of one or more unbound disks. One or more of the icons 206-212 can have an associated drop-down menus to allow a user to obtain one of (a) a display of information associated with the identified storage device, and (b) execution of at least one process to control, at least in part, the operation of the identified storage device.

Still referring to FIG. 3, the screen display 200 includes a sub-system display pane 214 in addition to the display pane 202. In practice, the sub-system display pane 214 displays specific information related to the selection by a user (via a mouse or the like) of a particular one of the icons 206-212. In the exemplary embodiment, highlighting the controller node icon 208 causes the sub-system display pane 214 to display more specific information about the controller node.

Referring to FIG. 2, following creation and display of the GUI during step 120, the host system 10 then awaits input from a user who typically selects one or more menu options. Such menu options can include (but are not limited to) the following:

bind a group of physical storage devices into a Logical Unit Number (LUN)

unbind a set of LUNs designate one or more storage devices as hot spares set each storage device system clock load vendor specific firmware to individual controllers and/or storage devices check/set vendor specific controller and/or storage device settings blink the storage device Light Emitting Diodes (LEDs) if present for identification purposes identify state information establish fibre channel fabric IDs for each storage device start or stop a RAID rebuild operation start or stop one or more consistency check operations initialize a file system in a discrete storage system After receipt of by a user of one or more menu selections, then the step 124 of FIG. 2 occurs, at which time the host system 10 of FIG. 1 processes the received menu selection. In practice, the host system 10 processes the menu selection through an appropriate software stack until the specific storage device to which the menu selection was directed executes the selection. Following step 124, step 126 occurs, whereupon the host system 10 automatically updates the GUI previously displayed to the user to reflect changes that occurred as a result of execution of the user-selected menu option. In this way, the user can visually observe the results of the selected menu option. Following step 126, program execution branches back to step 122 to wait for user selection of another menu option.

The foregoing describes a technique for managing one or more storage devices having different operating characteristics.

The invention claimed is:

1. A method for managing at least one storage device, comprising:
   identifying the at least one storage device;
   establishing a database containing information about the identified at least one storage device, wherein the information about the identified at least one storage device includes operating characteristics of the identified at least one storage device;
   providing to the user a graphical user interface in accordance with the information in the database, the graphical interface displaying at least one menu option for the identified at least one storage device for the user to select at least one of (i) display of the information about the identified at least one storage device and (ii) execution of at least one process to control the operation of the at least one storage device;
   processing the user-selected menu option, said processing further including:
   determining if a requested execution of the at least one process complies with configuration rules for the identified at least one storage device, and if not, blocking execution of the at least one process, and generating an error message, the configuration rules determined in accordance with the information in the database; and
   (e) automatically updating the graphical user interface in response to the processing of the user-selected menu option.

2. The method according to claim 1 wherein the identifying the at least one storage device comprises ascertaining a manufacturer and model number for the at least one storage device.

3. The method according to claim 1 wherein the establishing a database comprises obtaining information that includes at least one of (a) operational rules, (b) commands and (c) processing routines of the at least one storage device.

4. The method according to claim 1 wherein the providing a graphical user interface includes:
   displaying icons representative of each identified at least one storage device in a hierarchical fashion in a first pane; and
   displaying information in a second pane related to a corresponding one of the icons displayed in the first pane.

5. The method according to claim 1 wherein the processing and automatically updating are repeated following receipt of each subsequent menu selection made by a user.

6. An apparatus for managing at least one storage device, comprising:
   a database containing information about the at least one storage devices,
   wherein the information about the at least one storage device includes operating characteristics of the at least one storage device; and
   a processor coupled to the at least one storage device for (a) identifying the at least one storage device; (b) providing to a user a graphical user interface in accordance with the information in the database, the graphical interface displaying at least one menu option for the identified at least one storage device for the user to select at least one of (i) display of information about the identified at least one storage device and (ii) execution of at least one process to control the operation of the at least one storage device; (c) processing the user-selected menu option, by (i) determining if a requested execution of the at least one process complies with configuration rules for the identified at least one storage device, and if not, (ii) blocking execution of the at least one process; and (iii) generating an error message, the configuration rules determined in accordance with the information in the database; and (d) automatically updating the graphical user interface in response to the processing of the user-selected menu option.

7. The apparatus according to claim 6 wherein the processor identifies the at least one storage device by ascertaining its manufacturer and model number.

8. The apparatus according to claim 6 wherein the database contains information that includes at least one of (a) operational rules, (b) commands and (c) processing routines of the at least one storage device.

9. The apparatus according to claim 6 wherein the processor provides the graphical user interface by (a) displaying icons representative of each identified at least one storage devices in a hierarchical fashion in a first pane; and (b) displaying information in a second pane related, a corresponding one of the icons displayed in a first pane.

* * * * *